(12) United States Patent
Borzabadi et al.

(10) Patent No.: US 7,174,773 B2
(45) Date of Patent: Feb. 13, 2007

(54) LEAK-TESTING TECHNIQUE FOR DIFFERENTIAL PRESSURE SENSOR ARRAY

(75) Inventors: Hamid R. Borzabadi, Noblesville, IN (US); Dennis M. Koglin, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 105 days.

(21) Appl. No.: 11/109,315

(22) Filed: Apr. 19, 2005

(65) Prior Publication Data

US 2006/0230815 A1 Oct. 19, 2006

(51) Int. Cl.
*G01M 3/26* (2006.01)
*G01L 19/14* (2006.01)

(52) U.S. Cl. .................. 73/49.3; 73/1.57; 73/1.71; 73/46; 73/49.2; 73/49.7; 73/52

(58) Field of Classification Search .............. 73/1.57, 73/1.58, 1.63, 1.71, 40–49.8
See application file for complete search history.

(56) References Cited

U.S. PATENT DOCUMENTS

| | | | | |
|---|---|---|---|---|
| 596,581 | A * | 1/1898 | Edson | 73/1.68 |
| 4,799,377 | A * | 1/1989 | Strong et al. | 73/40 |
| 4,825,684 | A * | 5/1989 | Nishiguchi et al. | 73/1.59 |
| 5,668,305 | A * | 9/1997 | Chi et al. | 73/37 |
| 5,677,477 | A * | 10/1997 | Man et al. | 73/37 |
| 5,900,530 | A * | 5/1999 | O'Brien et al. | 73/1.57 |
| 6,640,611 | B2 * | 11/2003 | Ericson et al. | 73/1.57 |
| 6,688,156 | B2 * | 2/2004 | Dietrich et al. | 73/1.68 |
| 6,935,163 | B2 * | 8/2005 | Stewart et al. | 73/49.7 |
| 2006/0144156 | A1 * | 7/2006 | Borzabadi et al. | 73/754 |

FOREIGN PATENT DOCUMENTS

DE 19705799 A1 * 8/1998

* cited by examiner

*Primary Examiner*—Hezron Williams
*Assistant Examiner*—David A. Rogers
(74) *Attorney, Agent, or Firm*—Jimmy L. Funke

(57) ABSTRACT

A leak-testing technique and apparatus for differential pressure sensor arrays is provided. A reference pressure sensor array is provided, wherein a seal is disposed between the reference pressure sensor array and a target differential pressure sensor array. A probe socket is utilized to communicate with each individual sensor in the reference pressure sensor array. The target pressure sensor array and the reference pressure sensor array are sealed via a pressure plate and plunger assembly. The target pressure sensor array, seal, and reference pressure sensor array are exposed to a first pressure. The target differential pressure sensor array, seal, and reference pressure sensor array are then exposed to a second pressure. The probe socket verifies that all reference pressure sensors continue to output the first pressure. If the probe socket identifies a reference pressure sensor that reads the second pressure, then the corresponding target pressure sensor is identified as being defective because of leakage.

17 Claims, 5 Drawing Sheets

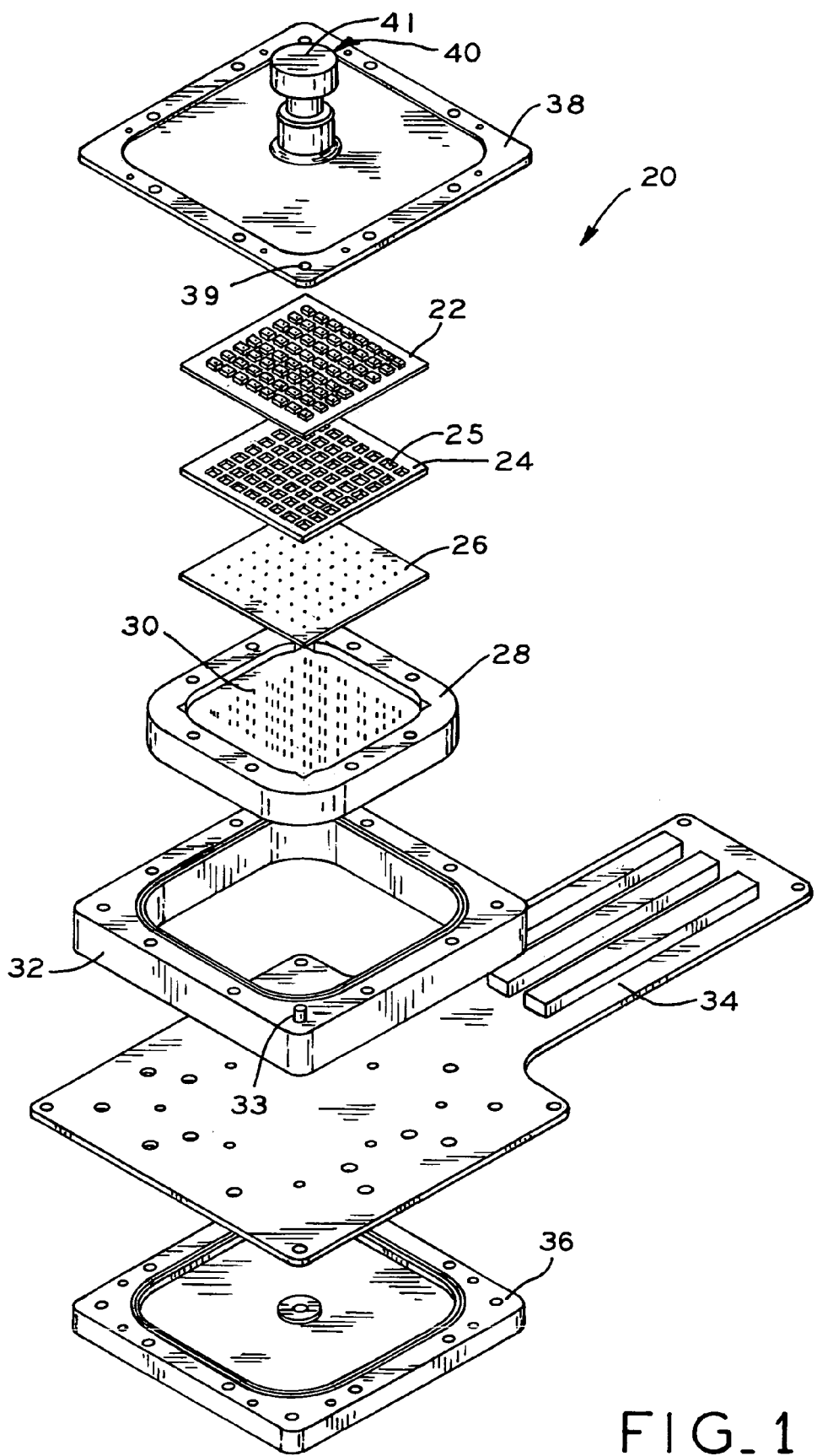
FIG_1

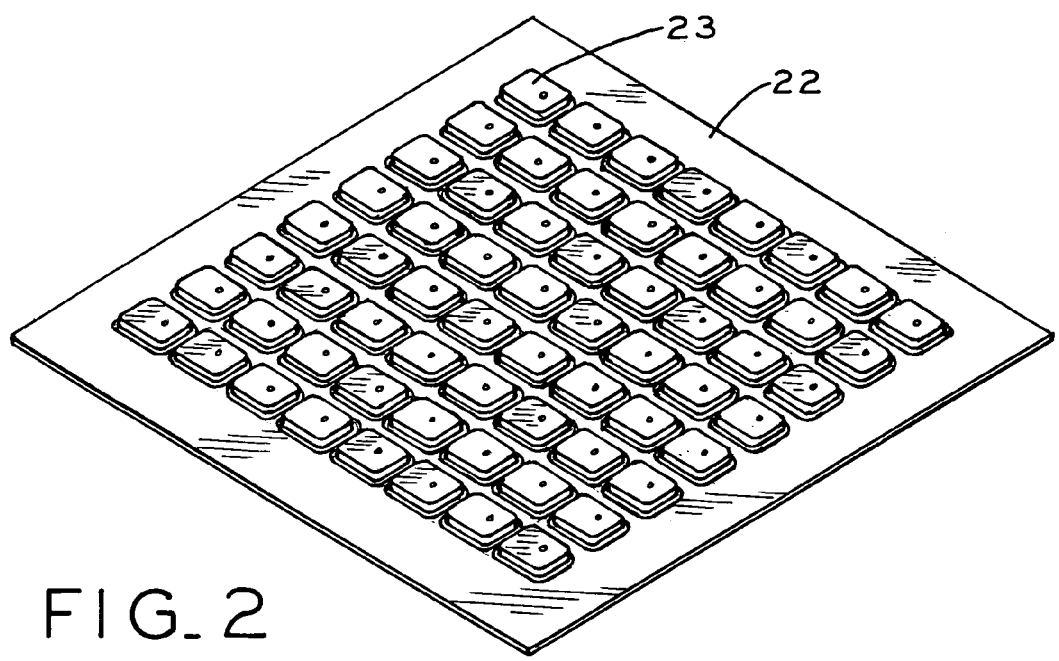
FIG_2
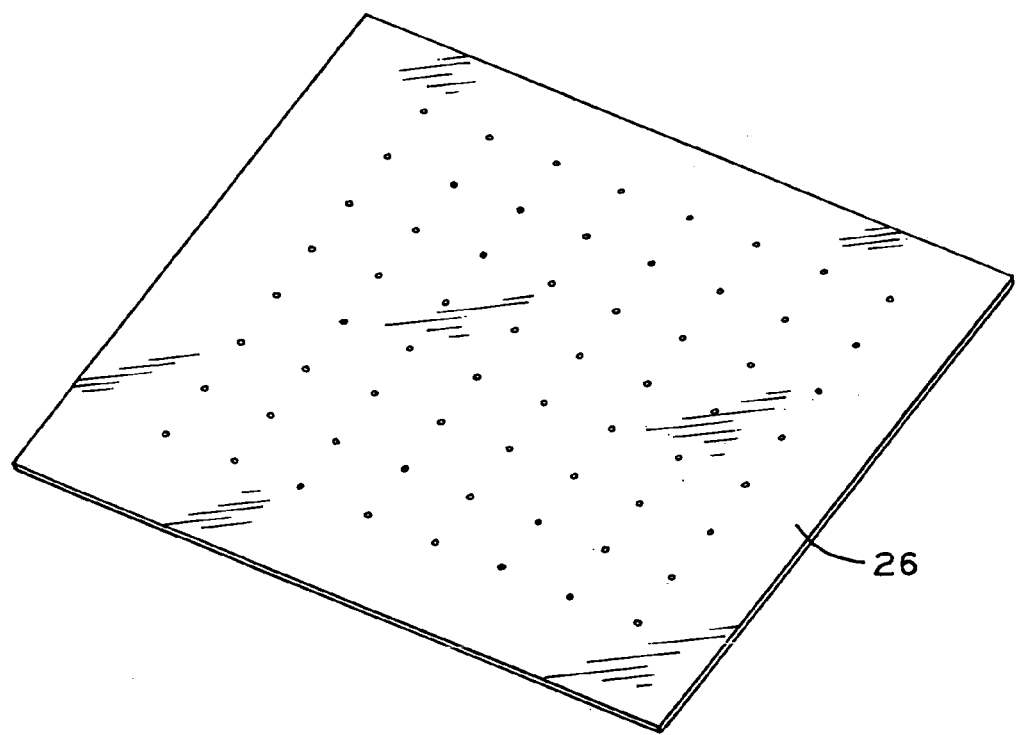
FIG_3

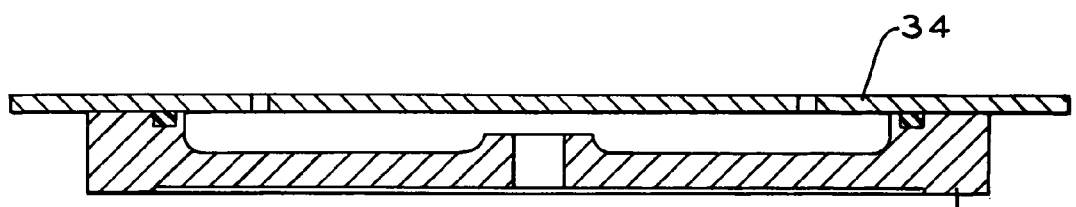
FIG_4
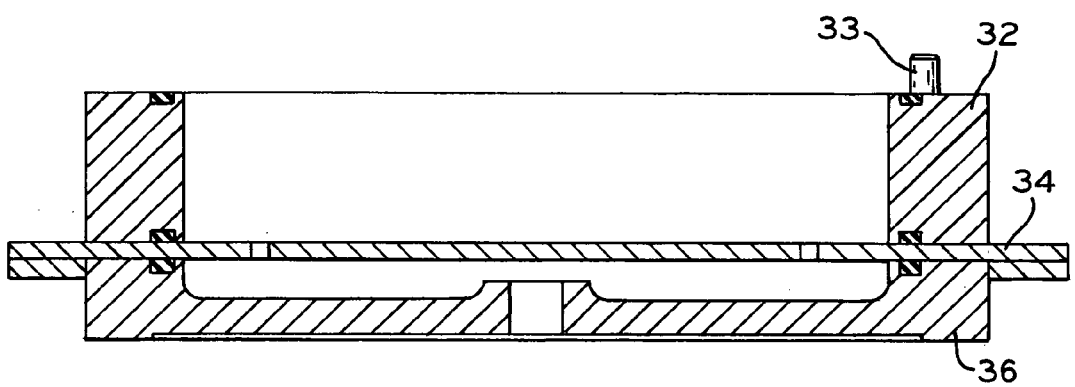
FIG_5
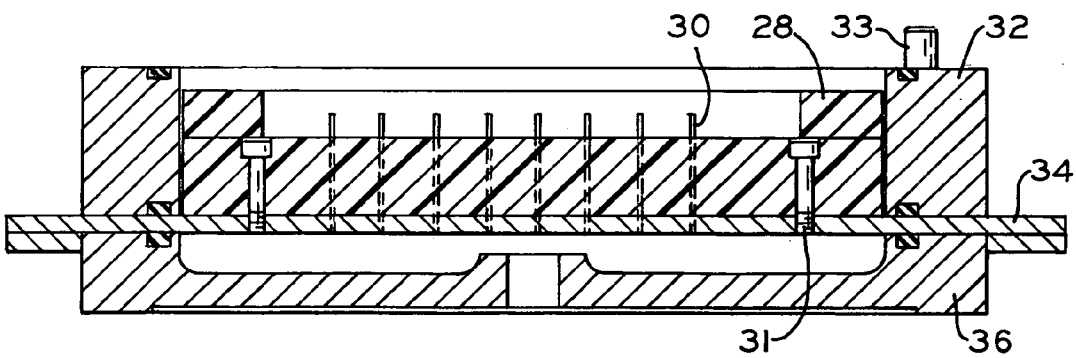
FIG_6
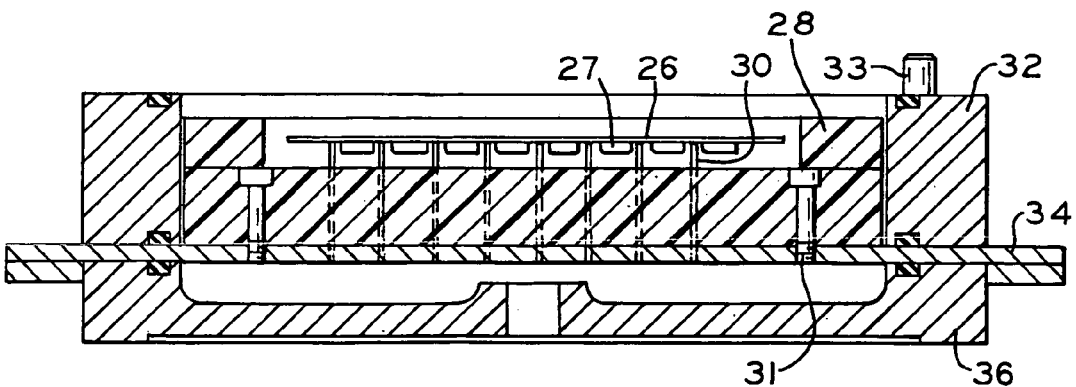
FIG_7

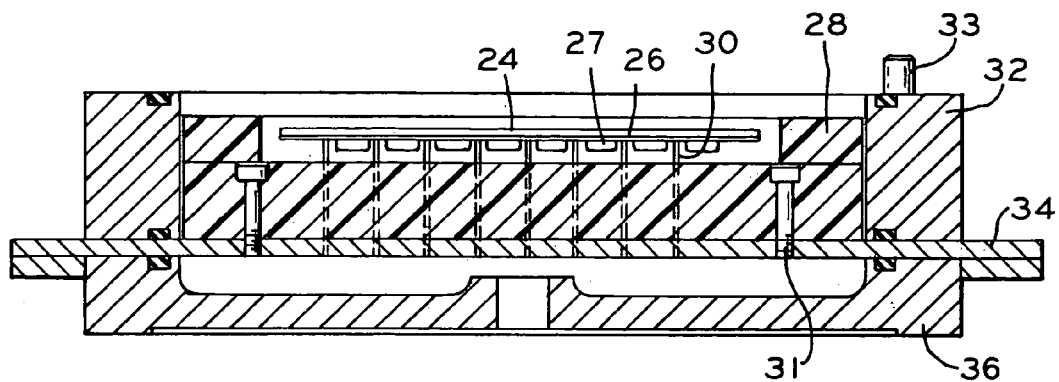
FIG_8
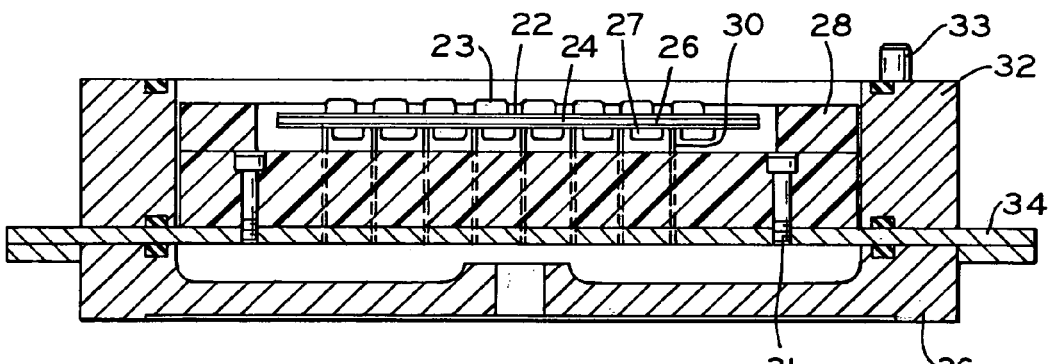
FIG_9
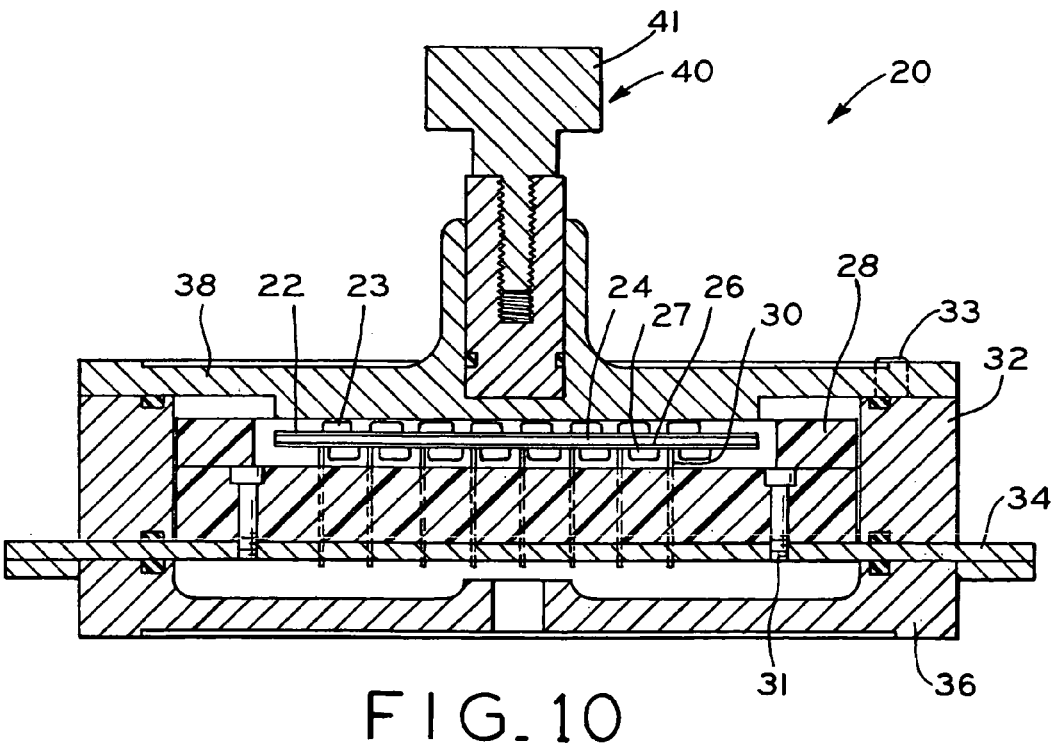
FIG_10

LEAK-TESTING TECHNIQUE FOR DIFFERENTIAL PRESSURE SENSOR ARRAY

TECHNICAL BACKGROUND

The present invention relates generally to differential pressure sensor arrays, and, more particularly, to a method for leak-testing a differential pressure sensor array.

BACKGROUND OF THE INVENTION

A differential pressure sensor is operable to detect a change in pressure between, for example, a reference pressure and atmospheric pressure. A differential pressure sensor is only useful, however, when no leaks are present in the sensor. If a leak is present in a sensor after a reference pressure is applied to the sensor, the sensor will revert to reading only atmospheric pressure because of the pressure decay across the sensor, and therefore will provide no differential pressure output. A sensor with a leak must be discarded, repaired, or replaced.

Before implementing a differential pressure sensor in a specific application, the sensor must be tested to detect if any leaks are present. This requires a device to individually assess each differential pressure sensor for leaks. Because differential pressure sensors are generally produced in a plate-like form, i.e., in a differential pressure sensor array arrangement, the leak-testing of each individual pressure sensor becomes cumbersome, time-consuming, and hazardous to the integrity of each pressure sensor.

SUMMARY OF THE INVENTION

The present invention provides a leak-testing technique and apparatus for differential pressure sensor arrays. A reference pressure sensor array is provided, wherein a compliant seal is disposed between the reference pressure sensor array and a target differential pressure sensor array. A probe socket is utilized to communicate with each individual sensor in the reference pressure sensor array. The target pressure sensor array and the reference pressure sensor array are sealed via a pressure plate and plunger assembly. The target pressure sensor array, seal, and reference pressure sensor array are exposed to a first pressure. The target differential pressure sensor array, seal, and reference pressure sensor array are then exposed to a second pressure. The probe socket verifies that all reference pressure sensors continue to output the first pressure. If the probe socket identifies a reference pressure sensor that reads the second pressure, then the corresponding target pressure sensor is identified as being defective because of leakage.

An advantage of the present invention is the removal of the need to individually test each pressure sensor in a pressure sensor array.

In one form thereof, the present invention provides a method for leak-testing a target differential pressure sensor array, including providing a reference pressure sensor array having a plurality of reference pressure sensors; sealing the reference pressure sensor array and the target differential pressure sensor array; subjecting the reference pressure sensor array and the target differential pressure sensor array to a first pressure; subjecting the reference pressure sensor array and the target differential pressure sensor array to a second pressure after the steps of sealing and subjecting the reference pressure sensor array and the target differential pressure sensor array to a first pressure; and measuring an output from each reference pressure sensor on said reference pressure sensor array after the step of subjecting said reference pressure sensor array and the target differential pressure sensor array to a second pressure.

In another form thereof, the present invention provides a leak-testing apparatus for testing a target differential pressure sensor array, including a reference pressure sensor array having a plurality of reference pressure sensors capable of being sealingly disposed with the target differential pressure sensor array; an interface circuit board; and a probe socket in selective communication with each reference pressure sensor of the reference pressure sensor array and the interface circuit board.

In yet another form thereof, the present invention provides a method for leak-testing a plurality of target differential pressure sensor arrays, including providing a plurality of reference pressure sensor arrays having a plurality of reference pressure sensors; sealing the plurality of reference pressure sensor arrays and the plurality of target differential pressure sensor arrays; subjecting the plurality of reference pressure sensor arrays and the plurality of target differential pressure sensor arrays to a first pressure; subjecting the plurality of reference pressure sensor arrays and the plurality of target differential pressure sensor arrays to a second pressure after the steps of sealing and subjecting the plurality of reference pressure sensor arrays and the plurality of target differential pressure sensor arrays to a first pressure; and measuring an output from each reference pressure sensor on the plurality of reference pressure sensor arrays after the step of subjecting the plurality of reference pressure sensor arrays and the plurality of target differential pressure sensor arrays to a second pressure.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 1 is an exploded view of the leak-testing apparatus of the present invention;

FIG. 2 is a perspective view of the top side of the target pressure sensor array of the present invention;

FIG. 3 is a perspective view of the bottom side of the reference pressure sensor array of the present invention;

FIG. 4 is a cross-sectional view of a portion of the leak-testing apparatus of the present invention, illustrating the pressure box bottom and the interface circuit board;

FIG. 5 is a cross-sectional view of a portion of the leak-testing apparatus of the present invention, further illustrating the pressure box top;

FIG. 6 is a cross-sectional view of a portion of the leak-testing apparatus of the present invention, further illustrating the probe socket;

FIG. 7 is a cross-sectional view of a portion of the leak-testing apparatus of the present invention, further illustrating the reference pressure sensor array;

FIG. 8 is a cross-sectional view of a portion of the leak-testing apparatus of the present invention, further illustrating the seal;

FIG. 9 is a cross-sectional view of a portion of the leak-testing apparatus of the present invention, further illustrating the target pressure sensor array;

FIG. 10 is a cross-sectional view of the leak-testing apparatus of the present invention, further illustrating the pressure plate and plunger assembly.

Figure 11:
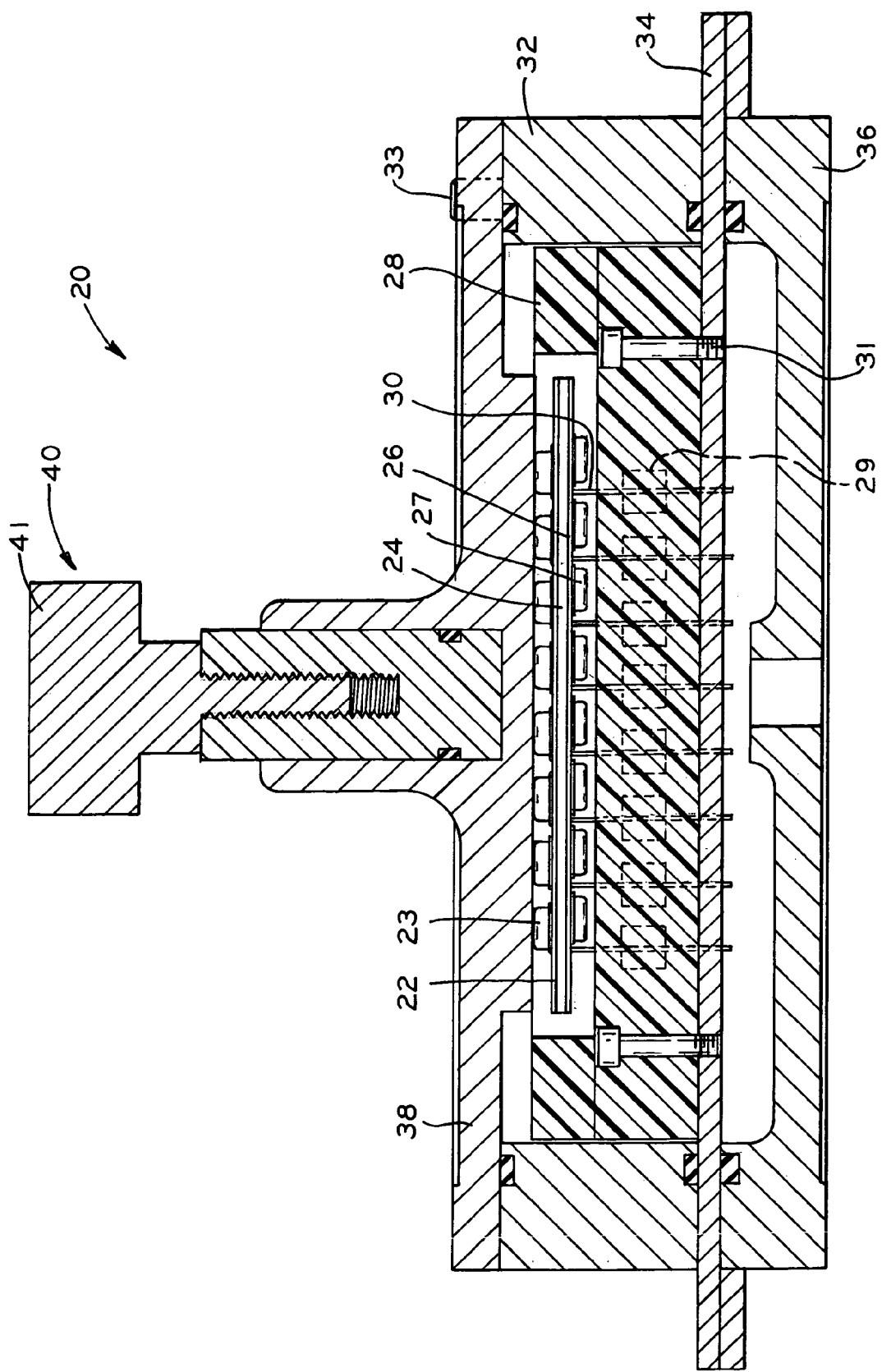
FIG. 11 is a cross-sectional view of the leak-testing apparatus of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplifications are not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

Referring now to FIG. 1, leak-testing apparatus 20 is shown in exploded view. Leak-testing apparatus 20 includes pressure box bottom 36 and pressure box top 32 sealable together to interface circuit board 34. Sealing pressure box bottom 36, pressure box top 32, and interface circuit board 34 (FIGS. 4 and 5) is necessary to prevent pressure from leaking out of apparatus 20 during testing, as will be described further hereinbelow. Pressure box bottom 36 and pressure box top 32 may be formed out of metallic material, such as aluminum or stainless steel. Leak-testing apparatus 20 further includes probe socket 28 formed, in one embodiment, of a high-temperature-resistant plastic. Probe socket 28 includes a plurality of contact elements 30. Each contact element 30 may, but not necessarily, include contact element mechanism 29 (FIG. 11), which could be a spring-loaded mechanism, for providing efficient contact between contact elements 30 and interface circuit board 34 in operation. Contact elements 30 may also have a spring-loaded mechanism only on the end in communication with each reference pressure sensor 27 and have the other end soldered or otherwise connected to interface circuit board 34.

Referring now to FIGS. 1–3, leak-testing apparatus 20 also includes reference pressure sensor array 26, seal 24, and target differential pressure sensor array 22. Reference pressure sensor array 26 includes a plurality of reference pressure sensors 27 (FIG. 7) disposed on a surface thereof. Each reference pressure sensor 27, prior to implementation in leak-testing apparatus 20, is tested, trimmed, and calibrated to ensure that each sensor 27 is a good unit, i.e., no leaks are present. Target pressure sensor array 22 includes a plurality of target pressure sensors 23 (FIG. 2) disposed on a surface thereof. Target pressure sensors 23 are those parts tested for leakage in the leak-testing method described hereinafter. Seal 24 includes a number of seal apertures 25 permitting communication between each target pressure sensor 23 and corresponding reference pressure sensor 27 during testing. Referring again to FIG. 1, leak-testing apparatus 20 additionally includes pressure plate 38 and plunger assembly 40, the operation of which will be described hereinbelow.

Referring to FIGS. 4 and 5, pressure box bottom 36 is sealed to the bottom side of interface circuit board 34 and pressure box top 32 is sealed to the top side of interface circuit board 34. Referring now to FIG. 6, probe socket 28 is placed inside the inner circumference of pressure box top 32 and secured to interface circuit board 34 via connectors 31. Contact elements 30 extend above the top surface of probe socket 28 to provide a point of contact with each reference pressure sensor 27. Referring now to FIG. 7, reference pressure sensor array 26 is placed on top of probe socket 28 with reference pressure sensors 27 oriented in an arrangement to contact with contact elements 30. Referring to FIG. 8, seal 24 is placed on top of reference pressure sensor array 26 such that each seal aperture 25 lines up with one reference pressure sensor 27. Referring now to FIG. 9, target pressure sensor array 22 is placed on top of seal 24 with target pressure sensors 23 oriented on a top surface of target pressure sensor array 22 such that each target pressure sensor 23 lines up with one seal aperture 25. Referring now to FIG. 10, pressure plate 38 with plunger assembly 40 associated therewith is placed on top of target pressure sensor array 22. Pressure box top 32 includes pin 33 to mate with aperture 39 on pressure plate 38 to ensure correct alignment of leak-testing apparatus 20.

The operation of leak-testing apparatus 20 will now be further explained with reference to FIG. 11. Plunger assembly 40 is forced downward onto pressure plate 38, for example, via knob 41, to compress target pressure sensor array 22 against seal 24, and, in turn, seal 24 against reference pressure sensor array 26. The downward compressive force seals target pressure sensor array 22 with reference pressure sensor array 26 via seal 24. Leak-testing apparatus 20 is then pressurized to a first pressure, for example, 50 p.s.i. (pounds per square inch). Leak-testing apparatus 20 is then pressurized to a second pressure different from the first pressure. In one embodiment, the second pressure is atmospheric or ambient pressure. Essentially, the first pressure is sealed between target pressure sensor array 22 and reference pressure sensor array 26.

The first pressure sealed between target pressure sensor array 22 and reference pressure sensor array 26 causes each contact element 30 to make contact with interface circuit board 34, thereby producing a known voltage, for example, 5 Volts, when one reference pressure sensor 27 contacts one contact element 30. If one of target pressure sensors 23 has a leak or is somehow defective, the first pressure will be lost to the exterior of leak-testing apparatus 20. If one of target pressure sensors 23 loses the first pressure, the corresponding reference pressure sensor 27 will no longer read the first pressure, but instead will read the second pressure at which apparatus 20 is currently being subjected to. If reference pressure sensor 27 detects the second pressure, corresponding contact element 30 will not fully contact interface circuit board 34 to provide a 5 Volt output. Instead, the output will be something different than the desired 5 Volt output.

A defective target pressure sensor 23 can be identified by using a computer (not shown) to analyze the data output from interface circuit board 34. The computer will look at all of the outputs corresponding to each target pressure sensor 23 and identify those that do not produce the expected output voltage. An operator can then simply mark each defective target pressure sensor 23 for later correction or replacement. This method effectively permits the testing of a large number of target pressure sensors 23 without requiring the individual testing of each target pressure sensor 23. In an alternative embodiment, leak-testing apparatus 20' (not shown) may include a plurality of target differential pressure sensor arrays 22 and reference pressure sensor arrays 26 to permit the testing of a very large number of target pressure sensors 23 at one time. The operation of such an apparatus 20' is substantially identical to the method described hereinabove for apparatus 20 with a single target pressure sensor array 22 and a single reference pressure sensor array 26.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for leak testing a target differential pressure sensor array comprising a plurality of target differential pressure sensors, the method comprising:
   (a) providing a reference pressure sensor array having a plurality of reference pressure sensors;
   (b) arranging said reference pressure sensor array and the target differential pressure sensor array such that each target differential pressure sensor is sealingly coupled to a reference pressure sensor;
   (c) after step (b) subjecting said reference pressure sensor array and the target differential pressure sensor array to a first pressure and measuring a first output from each of said reference pressure sensors;
   (d) after step (c) subjecting said reference pressure sensor array and the target differential pressure sensor array to a second pressure and measuring a second output from each of said reference pressure sensors; and
   (e) determining whether or not any of said target differential pressure sensors are leaky based on the measurements from steps (c) and (d).

2. The method of claim 1, wherein measuring an output from steps (c) and (d) each comprises measuring a voltage output from each of said reference pressure sensors.

3. The method of claim 1, wherein step (b) further comprises:
   providing a seal between said target differential pressure array and said reference pressure sensor array; and
   forcing said target differential pressure array and said reference pressure sensor array against said seal.

4. The method of claim 1, wherein the outputs from steps (c) and (d) are obtained by providing an interface circuit board along with a probe socket having a plurality if contact elements; wherein each of said plurality of contact elements electrically communicates with said interface circuit board to provide said outputs.

5. The method of claim 1, further comprising the step of testing each of said reference pressure sensors prior to step (b).

6. The method of claim 1, wherein in step (b) said reference pressure sensor array is provided in reverse format from the target differential pressure sensor array.

7. A leak-testing apparatus for testing a target differential pressure array having a plurality of target differential pressure sensors, comprising:
   a reference pressure sensor array having a plurality of reference pressure sensors;
   a seal adapted to allow said reference pressure sensor array to be sealingly disposed with the target differential pressure sensor array;
   an interface circuit board;
   a probe socket adapted to allow selective, electrical communication between each of said reference pressure sensors and said interface circuit board; and
   means for determining if any of said differential pressure sensors are leaky based on signal outputs from said interface circuit board.

8. The leak-testing apparatus of claim 7, wherein said selective, electrical communication is provided by a plurality of contact elements.

9. The leak-testing apparatus of claim 7, wherein said seal is disposed between said reference pressure sensor array and the target differential pressure array.

10. The leak-testing apparatus of claim 9, wherein said seal includes apertures allowing said reference pressure sensors to be in fluid communication with corresponding target differential pressure sensors.

11. The leak-testing apparatus of claim 9 wherein said seal is compliant.

12. A method for leak-testing a plurality of target differential pressure sensor arrays, each having a plurality of target differential pressure sensors, comprising:
   (a) providing a plurality of reference pressure sensor arrays each having a plurality of reference pressure sensors;
   (b) sealingly coupling each target differential pressure sensor to a reference pressure sensor;
   (c) after step (b) subjecting said plurality of reference pressure sensor arrays and the plurality of target differential pressure sensor arrays to a first pressure and measuring a first output from each of said reference pressure sensors;
   (d) after step (c) subjecting said plurality of reference pressure sensor arrays and the plurality of target differential pressure sensor arrays to a second pressure and measuring an output from each of said reference pressure sensors; and
   (e) determining whether or not any of said target differential pressure sensors are leaky based on the measurements from steps (c) and (d).

13. The method of claim 12, wherein measuring an output from steps (c) and (d) comprises measuring a voltage output from each of said reference pressure sensors.

14. The method of claim 12, wherein step (b) further comprises:
   providing a seal between each of said target differential pressure sensor arrays and said reference pressure sensor arrays; and
   forcing said plurality of target differential pressure sensor arrays and said reference pressure sensor arrays against said seals.

15. The method of claim 12, wherein the outputs from steps (c) and (d) are obtain by providing a plurality of interface circuit boards along with a plurality of probe sockets, each probe socket having a plurality of contact elements; wherein each of said plurality of contact elements electrically communicates with said plurality of interface circuit boards to provide said outputs.

16. The method of claim 12, further comprising the step of testing each of said reference pressure sensors prior to step (b).

17. The method of claim 12, wherein in step (b) said plurality of reference pressure sensor arrays are provided in reverse format from the plurality of target differential pressure sensor arrays.

* * * * *